L. COULET.
COMBINED BOX AND DROPPING BOTTLE WITH A SUGAR MAGAZINE.
APPLICATION FILED AUG. 1, 1912.
1,092,766.
Patented Apr. 7, 1914.
4 SHEETS—SHEET 1.
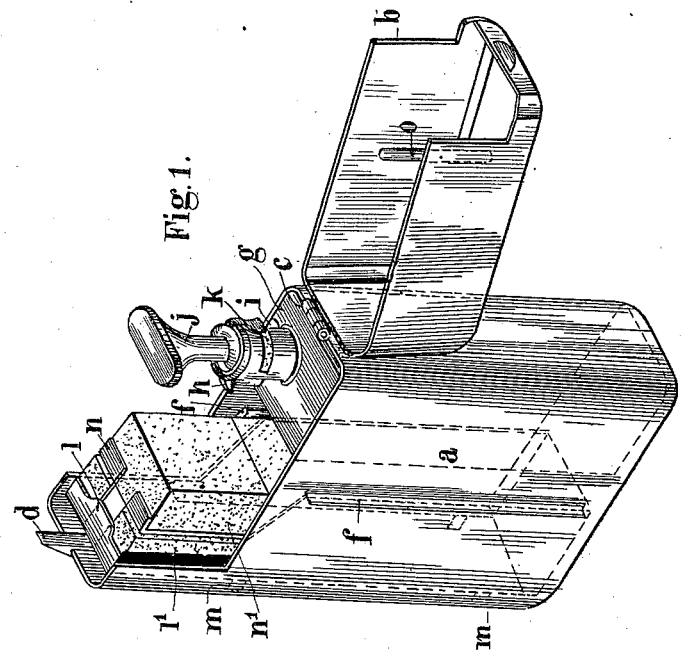
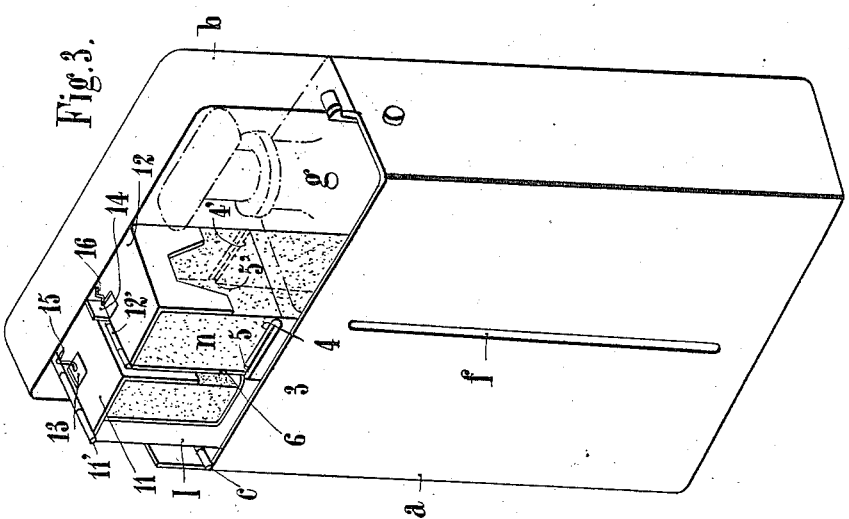
WITNESSES
E. B. McGee.
H. A. Coombe
INVENTOR
Léon Coulet
BY
Emil Bonnelycke
ATTORNEY L. COULET.
COMBINED BOX AND DROPPING BOTTLE WITH A SUGAR MAGAZINE.
APPLICATION FILED AUG. 1, 1912.
1,092,766.
Patented Apr. 7, 1914.
4 SHEETS—SHEET 2.
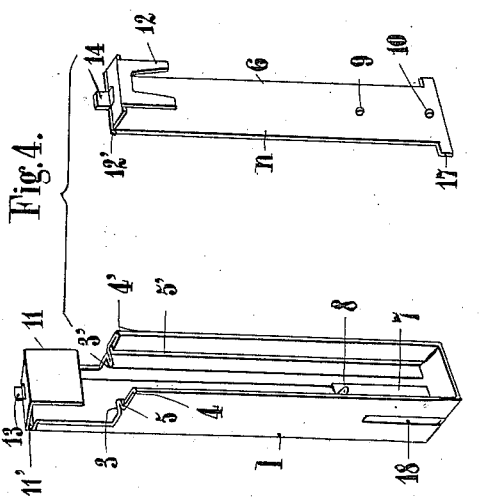
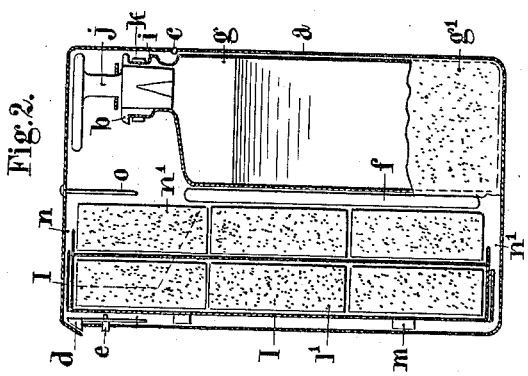
WITNESSES
E. G. McGee.
H. A. Coombs
INVENTOR
Léon Coulet
BY
ATTORNEY L. COULET.
COMBINED BOX AND DROPPING BOTTLE WITH A SUGAR MAGAZINE.
APPLICATION FILED AUG. 1, 1912.
1,092,766.
Patented Apr. 7, 1914.
4 SHEETS—SHEET 3.
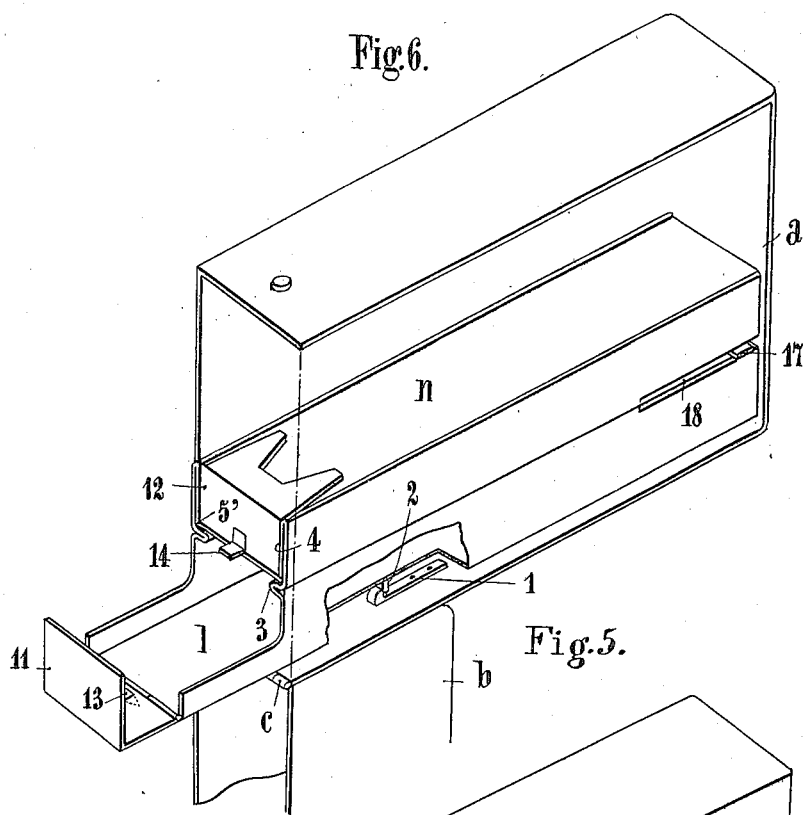
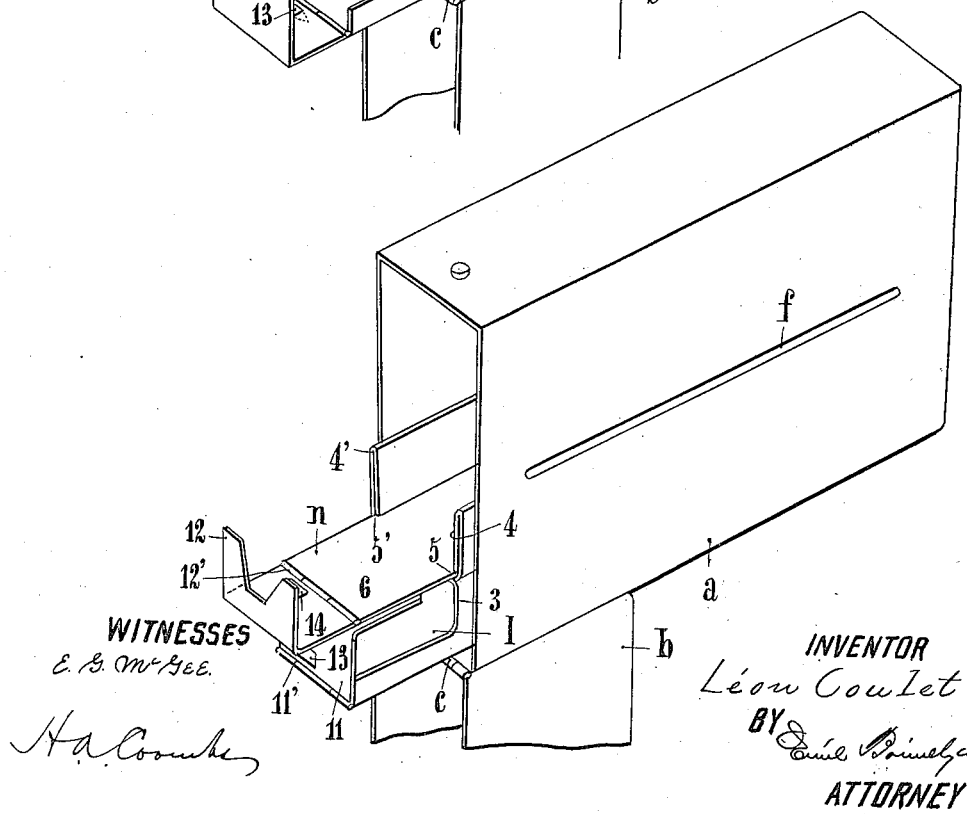

L. COULET.
COMBINED BOX AND DROPPING BOTTLE WITH A SUGAR MAGAZINE.
APPLICATION FILED AUG. 1, 1912.
1,092,766.
Patented Apr. 7, 1914.
4 SHEETS—SHEET 4.
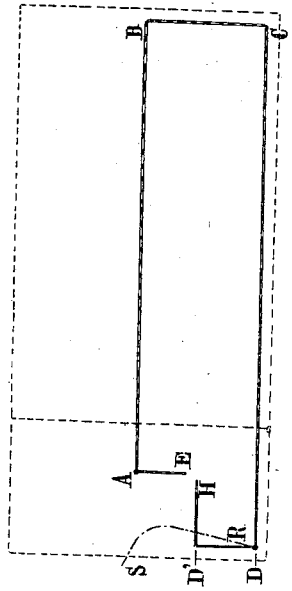
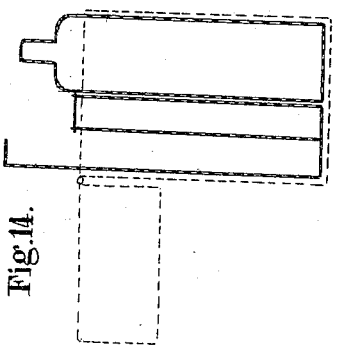
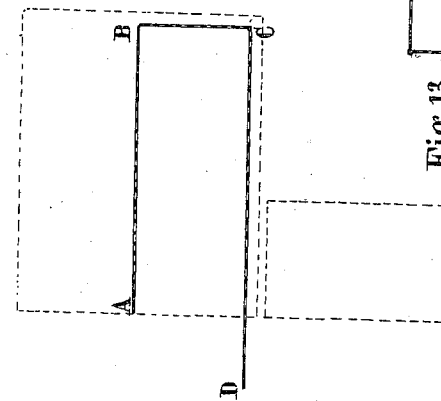
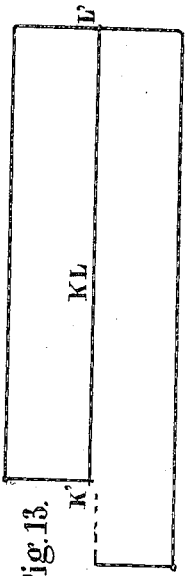
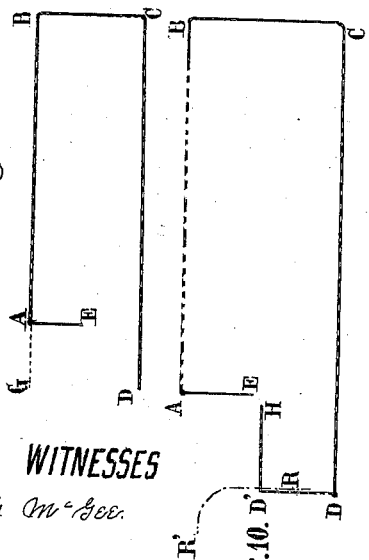
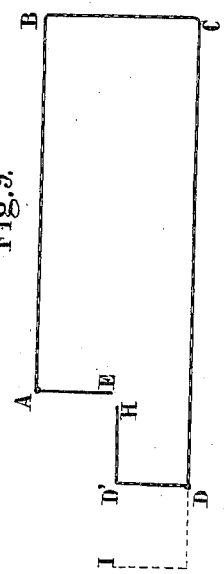
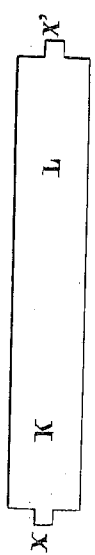
WITNESSES
E. G. McGee.
H. A. Coombs
INVENTOR
Léon Coulet
BY
ATTORNEY

UNITED STATES PATENT OFFICE.

LÉON COULET, OF HYÈRES-LES-PALMIERS, FRANCE.

COMBINED BOX AND DROPPING-BOTTLE WITH A SUGAR-MAGAZINE.

1,092,766.

Specification of Letters Patent. Patented Apr. 7, 1914.

Application filed August 1, 1912. Serial No. 712,707.

*To all whom it may concern:*

Be it known that I, LÉON COULET, a citizen of the Republic of France, and resident of Hyères-les-Palmiers, Var, France, have invented a new and useful Improved Combined Box and Dropping-Bottle with a Sugar-Magazine, which invention is fully set forth in the following specification.

This invention has for its object a box of very reduced size adapted to contain therein a dropping-bottle and a lump sugar magazine. This box, the edges of which are rounded or beveled, so as to be easily put in the pocket, is provided with a locking means constituted by a spring-hinged cover and a leaf spring controlled by a push-button. The dropping bottle, housed in the box and insulated from the latter by felt or other material, contains any suitable liquid, such as balm-mint-water, mint-alcohol or other alcoholate. The bottle stopper permits the liquid to be dropped only when the cover is open, and conversely, the cover can only be closed when the stopper is in closing position. A spring metal ring, embracing the bottle neck and engaging the stopper, prevents the latter from falling down. The magazine, divided into two compartments and containing sugar in lumps of usual size (for instance two or three at least for each compartment), is housed in the box opposite the bottle, and is spaced from said bottle by two inwardly extending projections on the side walls of the box. In order to avoid reducing the width of the magazine owing to the corners of the box, said magazine is provided with a plurality of legs which engage the adjacent wall of the box, such arrangement also permitting the operation of the leaf spring constituting the locking means for the cover. The movable metal partition separating the first compartment from the second compartment also separates the two rows of lumps and facilitates their sliding movement. When the lumps in the second compartment are consumed, they are replaced by those in the first compartment. A rod, secured to the top wall of the cover, prevents the lumps from tilting in the interior of the box when the cover is closed.

When the box is to be used, pressure applied on the opening knob releases the cover which swings completely open under the influence of its spring hinge, the stopper of the dropping-bottle is then turned a quarter revolution, which brings one opening in the stopper opposite the discharge nozzle for the liquid, and the other opening opposite the air inlet, and by tilting the whole box, the liquid will drop on to the uppermost lump of sugar in the magazine, which may be readily grasped and removed. In case the magazine is not full, the inclination of the box will bring the next lump to the proper position.

In order to render as clear as possible the following explanations, the annexed drawings illustrate by way of example the device forming the subject matter of the invention.

Figure 1 is a perspective view of the box opened. Fig. 2 is a longitudinal section of the box closed. Fig. 3 is a perspective view of a modified form of box, the cover being closed and partly broken away, and the sugar magazine filled up. Fig. 4 is a detail perspective view of the sugar magazine and its movable partition. Fig. 5 is a perspective view of the box, the first compartment being in use. Fig. 6 is a perspective view of the box, the second compartment being in use. Figs. 7 to 14 are diagrammatic views of further modifications.

In the form illustrated in Figs. 1 and 2, the box $a$ is shown as having beveled or rounded edges, and as closed by the cover $b$, which latter is connected at one end to the box by a spring hinge $c$ and is adapted for engagement at its other end by a hooked leaf-spring $d$, controlled by the knob $e$. Vertical indentations $f$ provided in the side walls of the box and projecting inwardly, serve to partition off a space within the box adapted to contain a dropping-bottle $g$ whose body is wrapped with a layer of felt $g'$, and whose neck is provided with an outlet $h$ and an air inlet $i$, and carries an emery stopper $j$, the head of which is extended, on one side, for more than half the width of the box. A ring $k$, of thin metal, holds the stopper in position. In the other half of the box is housed a magazine comprising a pair of juxtaposed vertical drawers or compartments $l$ and $n$, the compartment $l$ containing at least two or three lumps of sugar $l'$ and being provided with a plurality of legs $m$, which bear against the adjacent wall of the box. The second drawer or compartment n also contains at least two or three lumps of sugar n' and is designed to travel over the layer of lumps in the compartment l. In this way, the lumps l' are separated by the metal body portion of compartment n from the lumps n', which facilitate the sliding thereof. A rod o affixed to the cover holds the lumps n' in place when the cover is closed. This device has thus the advantage of uniting, within a box of very reduced dimensions, a dropping-bottle and a magazine containing a supply of lump sugar, the application of pressure against the knob e of the cover and a quarter revolution of the bottle stopper j permitting the soaking, by simply tilting the box, of a lump lying or being brought by the same tilting opposite the liquid outlet. The box can only be closed after the stopper has been re-set in closing position.

The form illustrated in Figs. 3 to 6, which is similar, in the main, to the form just described, renders more easy the reversal of the stopper under the action of its spring and permits each of the two compartments of the magazine to be used independently of the other without having to transfer into the first exhausted drawer the pieces of sugar contained within the second one. This arrangement has further the advantage of bringing more within the reach of the hand the lumps of sugar in proportion to the requirements. The spring-hinge c of the box a (Fig. 3), instead of being disposed at the right and to the side of the dropping-bottle, is placed at the left, in rear of the sugar-magazine; the portion of the box a containing the dropping-bottle g and the bottle itself—represented in dot and dash lines in Fig. 3—are similar to what has been previously described. The sugar-magazine l is set into the portion of the box adjacent to the hinge c; it is held in place by a leaf-spring 1 (Fig. 6) secured to said box and the hook of which engages a finger 2 projecting from the rear wall of magazine l. The side walls of magazine l are folded inwardly at 3 and 3' (Fig. 4) so as to constitute two inner vertical projections and folded down along their edges at 4 and 4' (Fig. 4), the spaces 5 and 5' between the projections 3 and 3' and the downfolds 4 and 4' constituting two longitudinal guide grooves. These guide grooves receive the adjacent edges of a slidable plate 6 (Fig. 4), which forms the rear wall of the second sugar compartment n. A leaf-spring 7, secured to the bottom wall of the magazine and provided with a tooth 8 serves to hold the plate 6 in either raised or lowered position, according as said tooth engages either the hole 9 or the hole 10 in said plate. The two compartments are both closed at their upper portion by covers 11 and 12 folded over squarely and mounted, by means of hinges 11' and 12', on the rear wall of compartment l and on the plate 6. In the vicinity of its hinge, each cover carries a cleat 13 or 14 of a suitable form; the cleat 13 being flexible about its point of junction with cover 11 and capable of yielding, and the cleat 14 being rigid. Springs 15 and 16 (Fig. 3) situated on the inner surface of the top of cover b engage the cleats 13 and 14, when said cover b is closed and plate 6 is raised, and will operate to tilt the corresponding covers 11 and 12 as soon as the cover b opens. Lastly, the plate 6 carries at its lower portion two small ears or lugs 17 (Fig. 6) which, when the plate is shifted upward and downward, slide in grooves 18 provided on the side walls of magazine l.

The manner in which the box, in this form, is used is as follows:—The box is tilted nearly horizontally with the hinge c downward (Fig. 5) and the knob e is pressed, the cover b opens and swings back rearwardly, carrying with it—through the agency of spring 16 which acts on the cleat 14—the cover 12 of compartment n, the partition plate 6 of which is held lifted by the tooth 8 of spring 7. Care must be taken when filling the sugar magazine, to fold down the cleat 13 of the cover 11, on which the spring 15 therefore cannot act. The pieces of sugar in compartment n then move down toward cover 12 which retains the same. It is only necessary to turn the bottle stopper to allow the discharge of liquid, as previously indicated. When this operation is completed, the stopper is again turned to close the bottle and the soaked piece of sugar is taken off. In closing, the cover b carries in the same direction with it the cover 12, and the whole comes back in the initial position. When compartment n is once exhausted, the sugar magazine is withdrawn, plate 6 is pressed down to the bottom of the magazine, where it will be retained by the engagement of the tooth 8 in the lower hole 9, and the magazine is then placed within its box. The outer end of the rear compartment l being thus uncovered and the cleat 13 on its cover being turned up, the lumps of sugar contained therein (Fig. 6) may be used as previously without having to first pass into the compartment n.

Figs. 7 to 14 relate to a form of construction of the box, in which the spring of the cover hinge is omitted. Furthermore, the magazine is modified to improve the operation of the device. This magazine which occupies, as in the preceding device, the lower half of the box, is constituted by a simple metal plate folded transversely upon itself at the points A, B, C, D (Fig. 7), and having a width equal to the inner thickness of the box. Its wall A, B, has the same length as the body alone of the box (not including the cover); the wall B, C, at right angles to the wall A, B, extends along the bottom of the box as illustrated in Fig. 7. The wall C, D, parallel to the wall A, B, whose length is nearly equal to that of the entire box, including the cover, projects from the body of the box, the cover of which is swung down and extends along the side of the box, on which the cover hinge is located (Fig. 7). To the end A of the wall A, B, is hinged a rigid plate A. E (Fig. 8) which may be swung into the position A. G indicated in dotted lines, (Fig. 8). Similarly, at D (Fig. 9) is hinged a rigid right-angular covering plate D, D', H which may be swung into the position indicated in dotted lines at D—I (Fig. 9). To about the middle of face D, D' of this plate is secured, at its base R, a leaf-spring R, R' indicated by a dot and dash line (Fig. 10). This leaf-spring is bent at its free end and is adapted to move along the dot and dash line R, S (Fig. 11) in a recess formed in the wall D' H, so that the box cover, in closing, will bear against said end and hold the same depressed as long as the box is closed. Lastly, the sugar magazine, arranged as indicated in Fig. 11, is divided into two compartments of the same width by a simple movable plate K L of the same width (Fig. 12). This plate K L is provided at its ends with fingers X, X', one of which is adapted to engage in a slot formed in the bottom wall of the magazine at L' (Fig. 13), while the other is adapted to engage in a slot formed in the top wall of the magazine at K'. To fill the magazine with pieces of sugar, the box is held upright, as indicated in Fig. 14, the plate D D' is swung into its dotted line position D I (Fig. 9) and the pieces are introduced into the open compartment. The other compartment is filled similarly by moving plate A E into its dotted line position A G (Fig. 8). For transferring the lumps of sugar from the small compartment into the large one, the box is inclined slightly toward the side of the cover, plate A E is moved into its dotted line position A G (Fig. 8) and the partition plate separating the two compartments is completely withdrawn, and replaced as soon as the lumps have slid into the large compartment (Fig. 14). To make use of the box, the same is held horizontally as indicated at Fig. 11, and the knob pressed to open the cover. When the cover swings open, the spring R, S (Fig. 11) which is compressed when the cover is closed, expands and acts on the covering plate D D' H, forcing it to assume the dotted line position D I (Fig. 9) and thus forming a platform. Onto this platform, the first lump of sugar may be caused to slide, by simply inclining the box or imparting a slight shock thereto, said lump when on the platform lying under the mouth of the bottle. The bottle stopper is next turned into position for the discharge of the liquid, and after the desired quantity has been dropped, it is returned to closing position, the lump of sugar is removed and consumed and the cover is again closed. The latter, in closing, bears against the spring R, R' (Fig. 10), which is thus forced to assume its position R, S (Fig. 11) carrying the covering plate with it into its full line position D D' H (Fig. 9).

In all of the forms of the invention, it is to be observed that the lump of sugar undergoing saturation will be held in place, stationary at the outer end of the magazine, beneath the mouth of the bottle. This is due to the provision of the covers with which the compartments are provided, in the constructions shown in Figs. 3 to 14, and to the lateral walls, flanges or projections on the outer ends of the compartments $l$ and $n$ in the construction shown in Figs. 1 and 2.

What I claim is:—

1. The combination, with a case comprising a body and a cover; of a dropping bottle and a lump-sugar magazine housed side by side in said case, said magazine having its outer end disposed adjacent the dropper of said bottle and provided with means for retaining a lump of sugar in place thereon to permit the contents of the bottle to be dropped upon said lump when the case is tilted.

2. A case containing a dropping bottle and a lump-sugar magazine, the latter of which is provided with means for holding a lump of sugar beneath the mouth of the bottle so that during a tilting movement of said case drops of liquid may be poured upon said lump.

3. The combination, with a case comprising a body and a cover; of a dropping bottle and a lump-sugar magazine fitted in said body and projecting into the interior of said cover when the same is closed, said bottle having its neck provided with a stopper whose head is elongated in one direction, to prevent closing of said cover except when said head is disposed longitudinally thereof.

4. A case containing a dropping bottle and a lump-sugar magazine, said magazine being provided with means for retaining a lump of sugar in position for removal therefrom, when the case is tilted, and said bottle being provided with liquid-outlet and air-inlet openings, the former of which is so arranged relative to said retaining means that during such tilting drops of liquid may be poured upon said lump.

5. A case containing a dropping bottle and a lump-sugar magazine, said magazine being provided with means for retaining a lump of sugar in position for removal therefrom when the case is tilted, and said bottle having its neck provided with liquid-outlet and air-inlet openings, the former of which is so arranged relative to said retaining means that during such tilting drops of liquid may be poured upon said lump, and a stopper rotatably fitted in said neck for controlling said openings.

6. A case comprising body and cover portions, the former of which contains a dropping bottle and a lump-sugar magazine, the latter having means for holding a lump of sugar thereon beneath the mouth of the bottle, when the case is tilted and the cover is open, to permit drops of liquid to be poured upon said lump, and a stopper rotatably fitted in the mouth of said bottle for controlling the dropping and having an elongated head to prevent closing of said cover except when said head is disposed logitudinally thereof.

7. A case having a dropping bottle and a lump-sugar magazine housed therein side by side, to permit a lump of sugar in said magazine to slide therealong into position opposite the dropper of the bottle, when the case is tilted, to permit drops of liquid to be poured upon said lump during such tilting, and means on said magazine for retaining said lump in such position.

8. A case containing a dropping bottle and a lump-sugar magazine, said bottle having its neck provided with a liquid-outlet opening and an air-inlet opening, and a stopper rotatably fitted in said neck for controlling said openings.

9. A closable case containing a dropping bottle and a lump-sugar magazine, said bottle having its neck provided with a liquid-outlet opening and an air-inlet opening, and a stopper rotatably fitted in said neck for controlling said openings and provided with an elongated head for preventing closing of the case when the stopper is in position to uncover said openings.

10. The combination, with a case, and a dropping bottle housed therein; of means arranged within said case for holding a lump of sugar directly beneath the dropper of said bottle, to permit drops of liquid to be poured upon said lump when the case is tilted.

11. A case having a dropping bottle and a lump-sugar magazine removably housed therein, to permit the same to be withdrawn, when empty, and refilled, said magazine being provided with means for holding one of the lumps therein beneath the dropper of the bottle, to permit drops of liquid to be poured upon said lump when the case is tilted.

In testimony whereof I have signed this specification in the presence of two subscribing witnesses.

L. COULET.

Witnesses:
 DAVID BOSE,
 RÉNÉ TALIGANT.

---

Copies of this patent may be obtained for five cents each, by addressing the "Commissioner of Patents, Washington, D. C."